United States Patent [19]

Austin

[11] Patent Number: 4,747,217

[45] Date of Patent: May 31, 1988

[54] PENDULUM STYLE LEVEL

[76] Inventor: Stanley L. Austin, 13010 Courtney Dr., Bellevue, Nebr. 68123

[21] Appl. No.: 96,039

[22] Filed: Sep. 14, 1987

Related U.S. Application Data

[63] Continuation-in-part of Ser. No. 835,643, Mar. 3, 1986, abandoned.

[51] Int. Cl.$^4$ ............................................. G01C 9/12
[52] U.S. Cl. ...................................................... 33/391
[58] Field of Search ................ 33/379, 381, 391, 397, 33/398, 399

[56] References Cited

U.S. PATENT DOCUMENTS

| | | |
|---|---|---|
| D. 211,754 | 7/1968 | Wullschleger . |
| D. 222,722 | 12/1971 | Ostrager . |
| D. 267,551 | 1/1983 | Seyler . |
| 842,874 | 2/1907 | Downs . |
| 1,058,320 | 4/1913 | Mitchell et al. . |
| 1,373,336 | 3/1921 | Knapp . |
| 1,691,632 | 11/1928 | Bartow . |
| 2,476,428 | 7/1949 | Nagoda . |
| 2,598,552 | 5/1952 | Jansen . |
| 2,694,865 | 11/1954 | Le Pera ................................. 33/391 |
| 2,694,866 | 11/1954 | Hanaver . |
| 2,775,044 | 12/1956 | Beebout . |
| 2,847,765 | 8/1958 | Bateman . |
| 3,196,552 | 7/1965 | Richards . |
| 3,233,235 | 2/1966 | Wright . |
| 3,241,245 | 3/1966 | Levine . |
| 3,311,990 | 4/1967 | Wright . |
| 3,374,549 | 3/1968 | Hanson . |
| 4,163,325 | 8/1979 | Hughes . |
| 4,208,803 | 6/1980 | Brown ............................. 33/379 X |
| 4,506,450 | 3/1985 | Fleming . |

FOREIGN PATENT DOCUMENTS 175205  2/1917  Canada .
3310359  9/1983  Fed. Rep. of Germany ........ 33/379

OTHER PUBLICATIONS

Levels, by Joseph Truini, Popular Mechanics, Jun. 1987, pp. 95, 96, 97, 144.

Primary Examiner—Harry N. Haroian
Attorney, Agent, or Firm—Zarley, McKee, Thomte, Voorhees & Sease

[57] ABSTRACT

A carpenter's level is described which includes an inclination indicator mounted in the web of an I-beam shaped frame. The inclination indicator includes a pair of transparent window panels affixed on each side of the web to enclose an aperture in the web, the window panels having interiorly directed sockets for holding the pin upon which a pendulum swings. Indicia is imprinted on the inside face of the window panels so that it will not wear off. Bolt holes through the window panels and web positively seat the window panels in alignment with the level's faces. Adjustment screws through the pivot shaft apertures at the center of each of the window panels enable axial adjustment of the pendulum and pivot shaft.

11 Claims, 5 Drawing Sheets

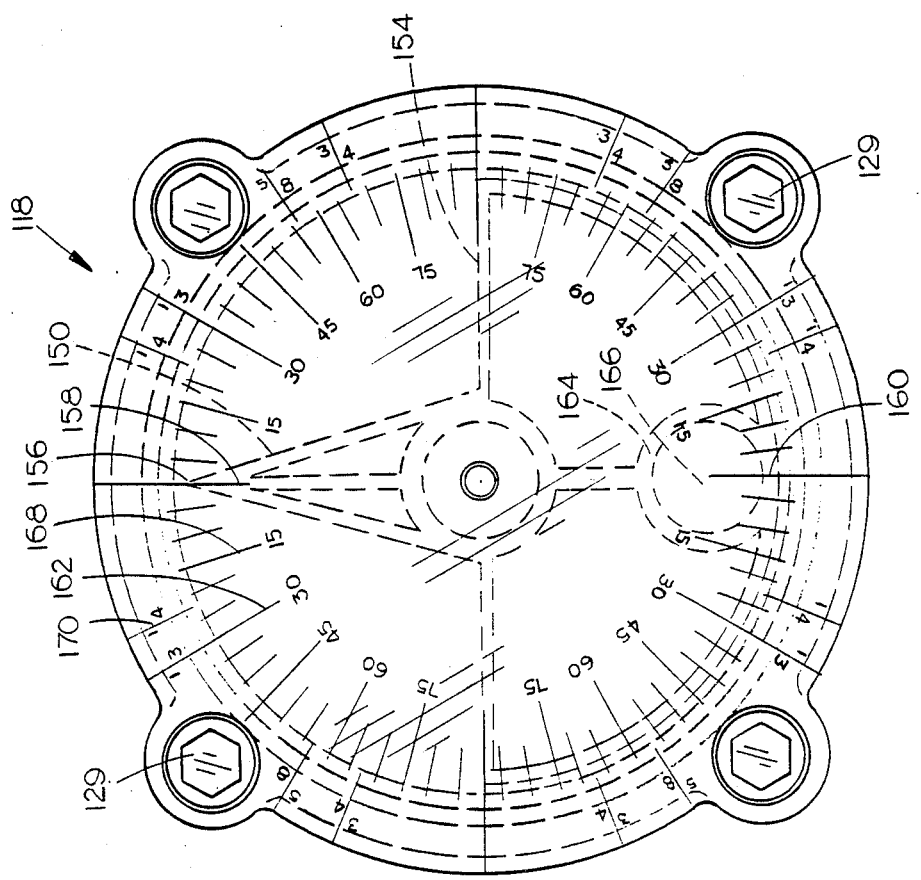
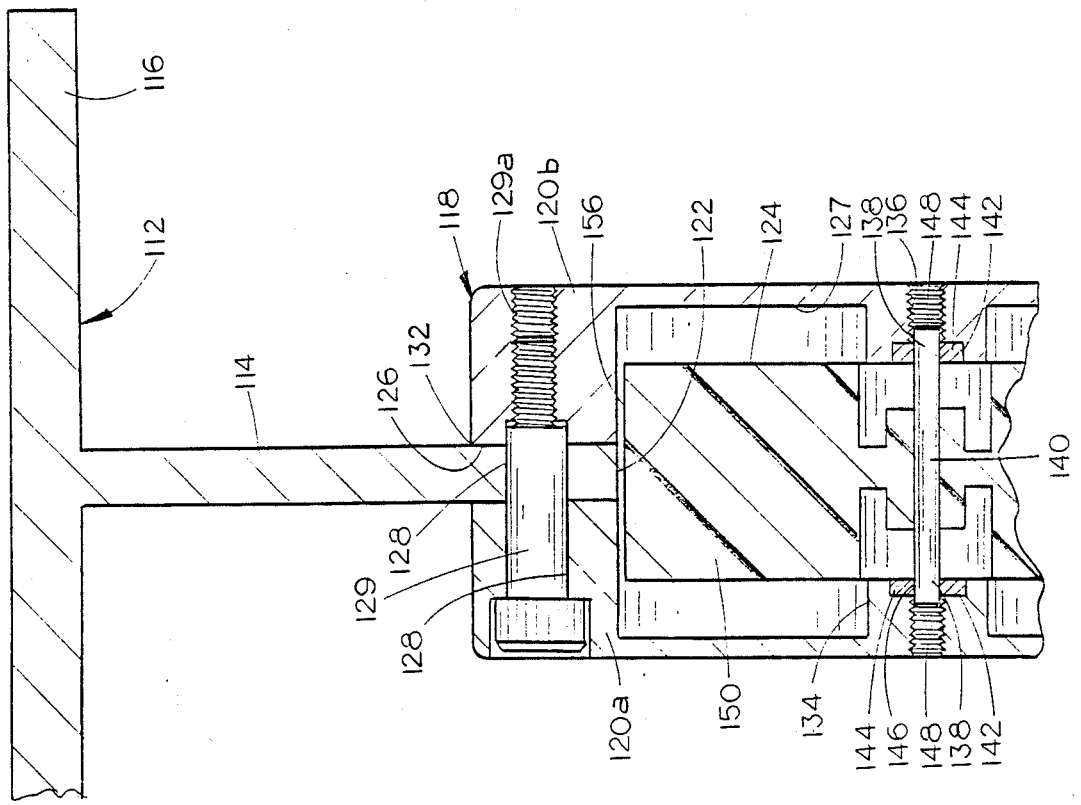
FIG. 8
FIG. 7

PENDULUM STYLE LEVEL

CROSS REFERENCE TO RELATED APPLICATION

This application is a continuation-in-part of patent application Ser. No. 835,643 filed on Mar. 3, 1986 now abandoned.

BACKGROUND OF THE INVENTION

This invention relates generally to levels and more particularly to an improved pendulum type level.

Levels have been used by carpenters and repairmen for many years, and typically are of the bubble type referred to as spirit levels. However, such levels have been generally limited to merely indicating whether a surface is horizontal or vertical. In situations where the inclination of a surface must be tested a conventional level is woefully inadequate. Bubble type levels typically are not capable of accurately indicating minute differences in slopes or angles. Pendulum levels are not known to have ever been commercialized and those disclosed in prior patents may be difficult to use since the pendulums would appear to sway back and forth upon even minute movements of the level. Also such levels are typically only readable in an upright fashion and on only one side of the level.

It is therefore a principal object of the present invention to provide an improved pendulum type level.

Yet another object of the invention is to provide a pendulum type level with an indicator which has a minimal amount of sway in the pendulum.

Still another object of the invention is to provide an improved level which may be read from either face and in an inverted position.

Another object of the invention is to provide a pendulum type level adapted to maintain the pendulum in permanent alignment.

Another object of the invention is to provide a pendulum type level with a pendulum supported for axial adjustment, thereby to maintain pendulum alignment despite any warpage of the window panels over time.

Another object of the invention is to provide a pendulum type level with indicia which cannot be worn off.

Another object is to provide a pendulum type level with indicator windows which are positively seated on the level such that components of the indicator may be replaced and automatically realigned.

Yet another object of the invention is to provide a pendulum type level which is economical to manufacture, durable in use, and has easily replaceable components.

These and other objects will be apparent to those skilled in the art.

BRIEF DESCRIPTION OF THE DRAWINGS

FIG. 7 is a further enlarged partial sectional view of a portion of the inclination indicator;

FIG. 8 is a front view of the indicator; and

SUMMARY OF THE INVENTION

A carpenter's level is described which includes an inclination indicator mounted in the web of an I-beam shaped frame. The inclination indicator includes a pari of transparent window panels affixed on each side of the web to enclose an aperture in the web, the window panels having interiorly directed sockets for holding the pin upon which a pendulum swings. The pendulum has a semi-circular lower portion which resists residual sway of the pendulum. Indicia is imprinted on the inside face of the window panels so that it will not wear off. Bolt holes through the window panels and web positively seat the window panels in alignment on the level's frame.

Precise radial positioning of the pendulum pivot shaft is assured by rotational support of the opposite ends of the pivot shaft in bushings press fit into sockets on the interior face of the window support panels. While the relatively small inside diameter of the bushings minimizing frictional contact with the pivot shaft, the relatively larger outside diameter maximizes surface contact between the bushing and socket for uniform accurate positioning of the bushing and pivot shaft. Allen screws engagable with the ends of the pivot shaft provide for axial adjustment of the pendulum for maintaining uniform and accurate positioning of the pendulum despite any warpage of the window support panels over time.

DESCRIPTION OF THE PREFERRED EMBODIMENT

Figure 1:
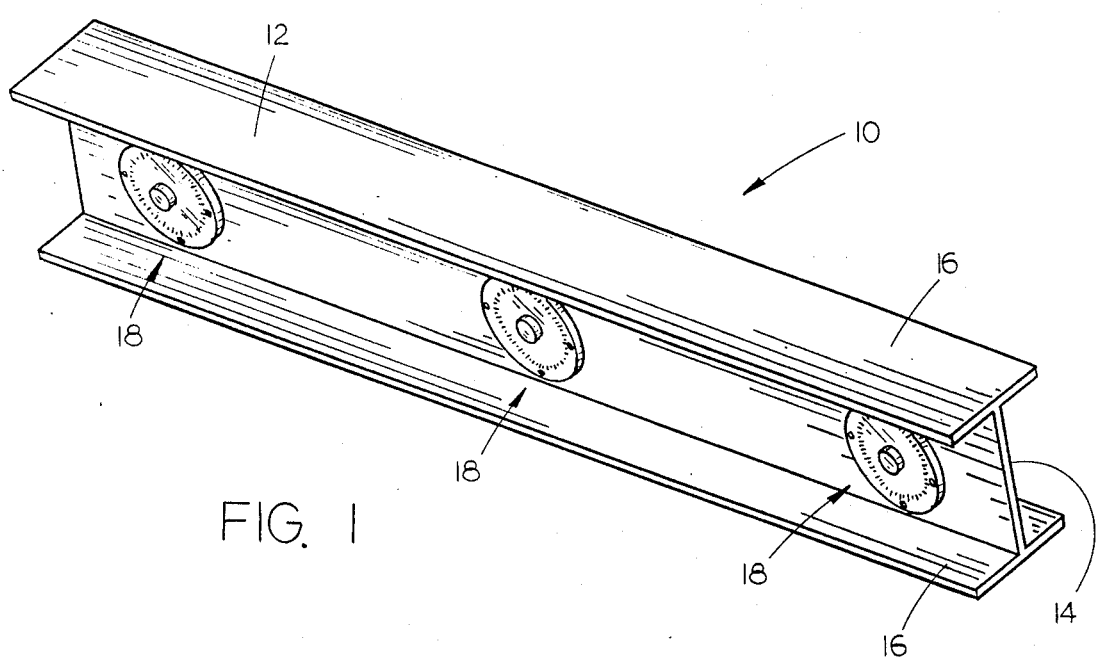
FIG. 1 is a perspective view of the invention.

The carpenter's level of this invention is designated generally with the reference number 10 in FIG. 1, and includes a frame 12 in the shape of an I beam having a web 14 and parallel upper and lower flanges 16. The level 10 shown in FIG. 1 includes three inclination indicators 18 mounted along web 14.

Figure 2:
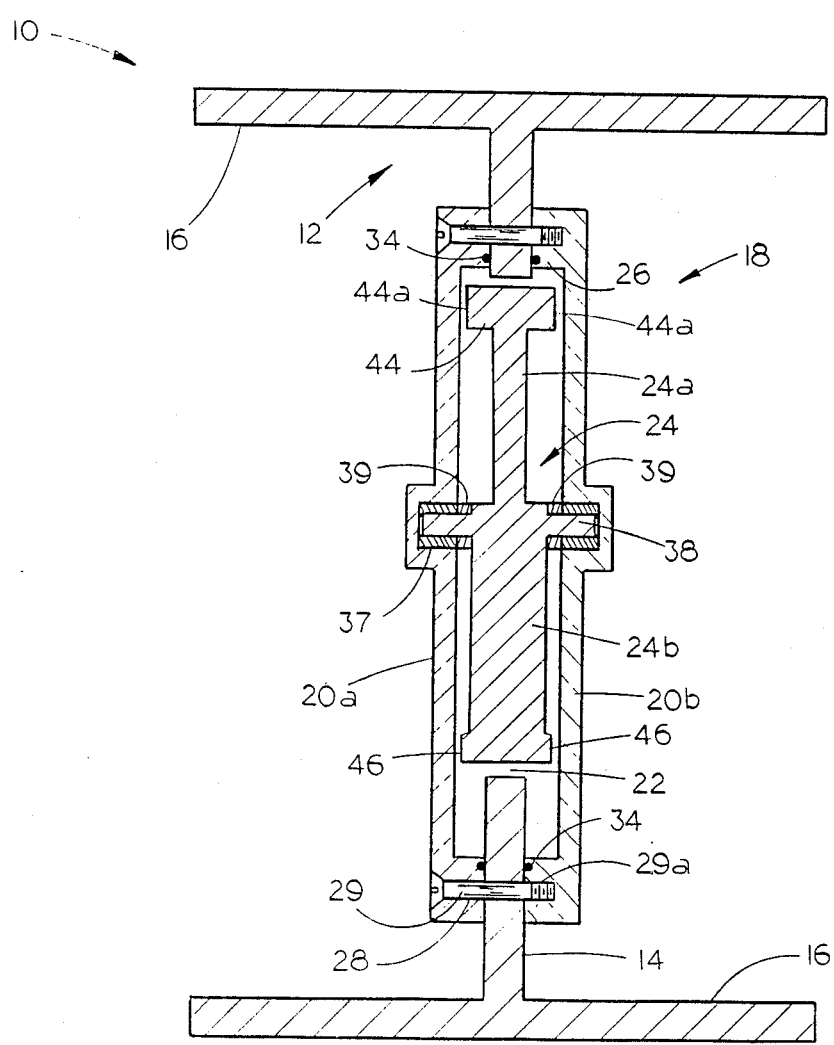
FIG. 2 is a cross sectional view of the invention.

Referring now to FIG. 2, each inclination indicator 18 includes a front 20a and rear 20b circular, transparent window panel affixed on opposing sides of web 14 to enclose an aperture 22 therebetween, and a pendulum 24 rotatably mounted between window panels 20a and 20b.

Figure 3:
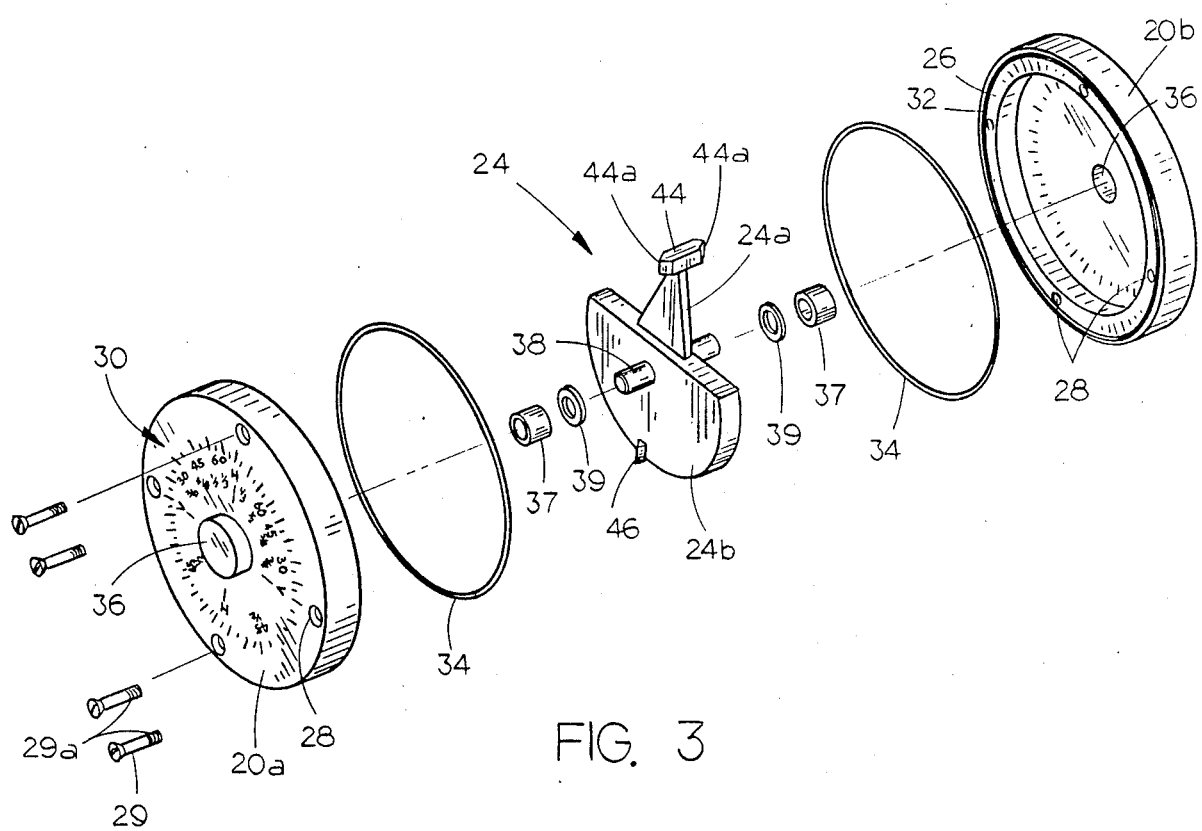
FIG. 3 is an exploded perspective view of an inclination indicator of the invention.
Figure 4:
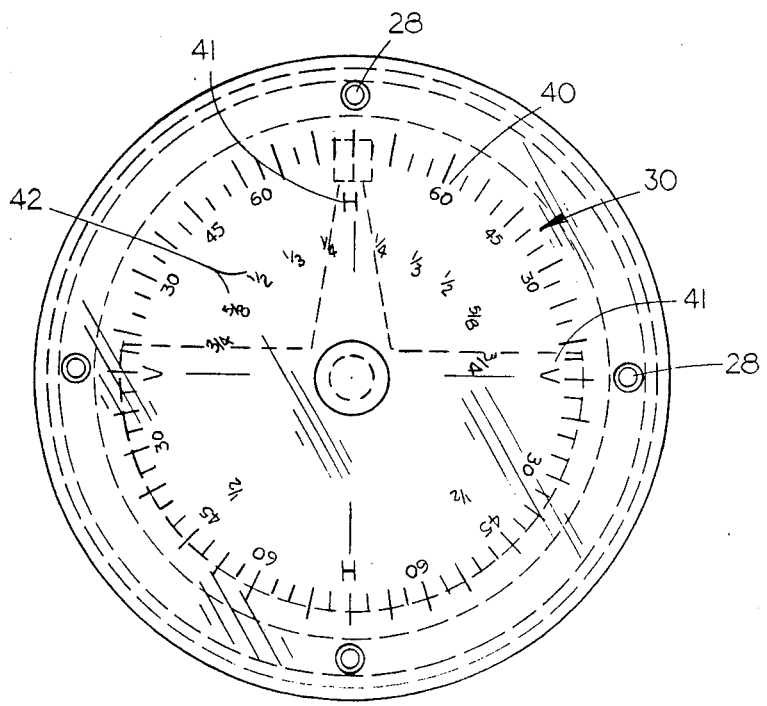
FIG. 4 is a front view of an inclination indicator of the invention.

Referring now to FIGS. 2 and 3, four bolt holes 28 are countersunk through front panel 20a, web 14 and into rear panel 20b. Only about one-half of the portion of bolt hole 28 within rear panel 20b is threaded, thereby corresponding to the partially threaded portion 29a of each bolt 29. In this way, bolt 29 will completely fill bolt hole 28 for a positive and accurate positioning of window panels 20a and 20b in web 14. Since indicia, designated generally at 30, are imprinted on window panels 20a and 20b for indicating the amount of deviation of level 10 from the vertical or horizontal, it is important that the indicia 30 be correctly and accurately aligned with frame 12. The positive seating of window panels 20a and 20b makes repair or replacement of a component of the inclination indicator 18 a simple task. Realignment of the panels 20a and 20b makes repair or replacement of a component of the inclination indicator 18 a simple task. Realignment of the panels 20a and 20b with frame 12 is automatic upon tightening of bolts 29 within bolt holes 28. Of course, other similar means could be utilized. For example, indentations in web 14 in combination with corresponding projecting tabs on window panels 20a and 20b could be used. A clamp, or other device, could then be used to hold window panels 20a and 20b against web 14.

Each window panel 20a and 20b has an annular rim 26 along its perimeter which projects from the interior face towards web 14. Each of window panels 20a and 20b has a toroidal groove 32 cut along the interior face of rim 26, into which a conventional O-ring 34 is inserted to seal out moisture. An interiorly directed socket 36 is formed in the center of each window panel 20a and 20b and holds an end of pin 38 projecting from each side of pendulum 24. Pin 38 is journaled for rotatable movement within a bushing 37 in each socket 36, and serves as the axis about which pendulum 24 swings. A felt washer 39 on pin 38 holds lubricant in place in bushing 37.

The interior face of each window panel 20a and 20b is imprinted with concentric rings of indicia 30. Suggested indicia include: degree gradations 40, (from 0 to 90 degrees); horizontal and vertical markings 41; and gradations indicating typical roof slopes 42. Obviously many different kinds of markings are possible with the instant invention.

Referring again to FIGS. 2 and 3, pendulum 24 is generally planar and includes an upper needle-shaped portion 24a which serves as an indicator arm and a lower semi-circular shaped portion 24b which serves as a weight. Needle portion 24a projects perpendicularly from the middle of the straight edge of semi-circular portion 24b and will indicate true vertical in relation to weight portion 24b. It can be seen that pin 38 is located substantially at the center of the diameter of semi-circular portion 24b and at the center of the base of needle portion 24a. As shown in FIG. 2, semi-circular portion 24b is thicker than needle portion 24a, and has a radius substantially equal to the length of needle portion 24a. The center of gravity for pendulum 24 is along a line passing through pin 38 and the outermost tip of needle 24a, and located slightly below pin 38. The inventor has found that the use of a semi-circular weight on pendulum 24 produces a center of gravity slightly below the center of the circle of the semi-circular portion. This substantially eliminates all swaying of needle portion 24a while using level 10. In fact, the inventor has found that rotation of the level completely upside down will not cause the pendulum to sway.

A pointer arm 44 is centered on the tip of needle portion 24a and projects perpendicularly outwardly therefrom in both directions. Pointer arm 44 has a length slightly less than the distance between window panels 20, so that it comes very close to each panel. Each face of pointer arm 44 which is adjacent a window panel 20 is beveled to form a vertical edge 44a. A similar beveled projection 46 is mounted on opposing faces of semi-circular portion 24b diametric to pointer arm 44. Thus, indicia on window panels 20 may be read from the top or bottom.

A second embodiment of the level is illustrated in FIGS. 5–8. The level 110 includes an I-beam shaped frame 112 having a web 114 and upper and lower flanges 116 arranged perpendicular to the web and parallel to one another. Level 110 includes a single inclination indicator 118 longitudinally centered on web 114 between a pair of finger grip openings 119.

Figure 5:
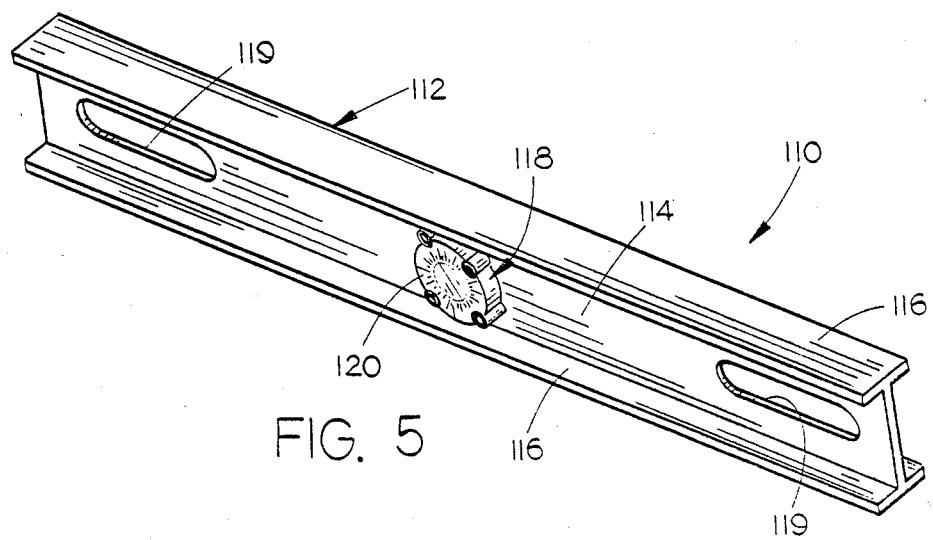
FIG. 5 is a perspective view of an alternate embodiment of the invention.
Figure 6:
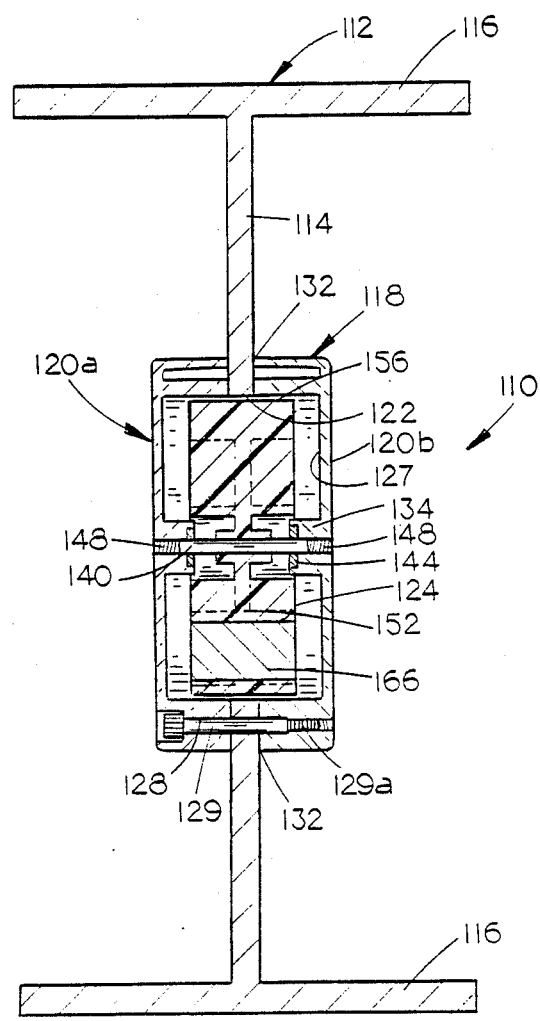
FIG. 6 is an enlarged sectional view through the inclination indicator of the level of FIG. 5.
Figure 9:
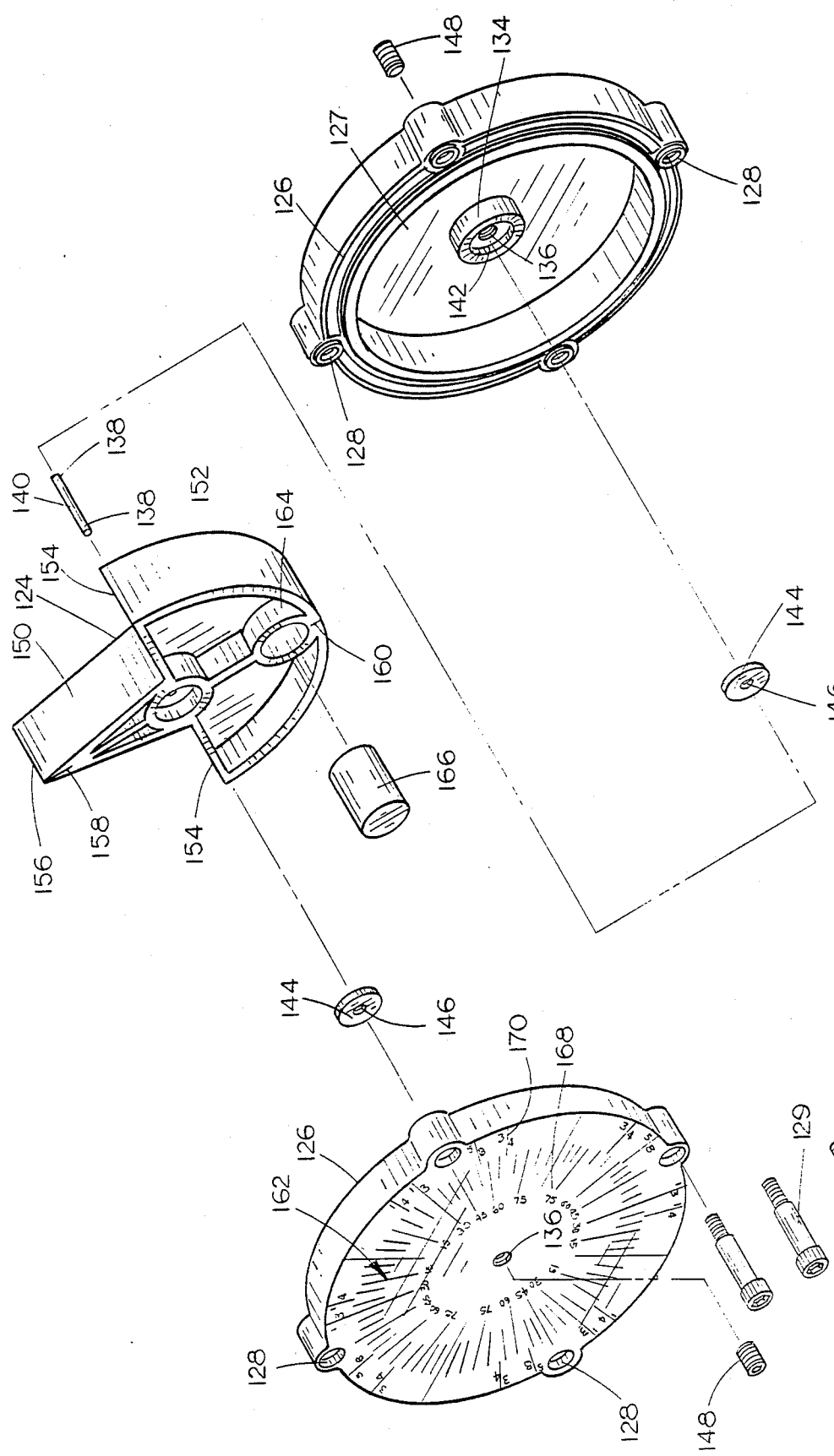
FIG. 9 is an exploded perspective view of the inclination indicator.

Referring to FIGS. 5–7, inclination indicator 118 includes a front 120a and rear 120b circular, transparent window panels fixed on opposite sides of web 114 to enclose an aperture 122 in the web, and a pendulum 124 is rotatably supported on and between the window panels 120a and 120b. Four bolt holes 128 are countersunk through front panel 120a, web 114 and rear panel 120b. Only a portion of bolt hole 128 within rear panel 120b; is threaded for receiving the corresponding threaded portion 129a of each bolt 129. The diameter of the unthreaded portion of bolt 129 completely fills the unthreaded portion of bolt hole 128, but for the enlarged end opening for receiving the bolt head, for a positive and accurate positioning of the window panels 120a and 120b relative to the frame web 114. Upon removal and reinstallation of either or both panels, realignment of the panels occurs automatically upon tightening of bolts 129 due to the single bolt passing through the aligned openings of both panels and web 114.

Each window panel 120a and 120b has an annular rim 126 along its perimeter which projects from the interior face 127 towards web 114. A bead of silicon adhesive 132, or the like, is applied wet to web 114 around aperture 122 to seal the annular rim 126 of each panel to the web and thereby prevent foreign matter from entering the interior space occupied by the pendulum 124.

A central projection 134 on the interior face 127 of each panel 120 has a threaded aperture 136 therethrough, which aperture is centrally positioned on the inclination indicator 118 for receiving outer end portions 138 of the pendulum pivot shaft 140. The interior end of threaded aperture 136 opens into an enlarged concentric bushing socket 142 in projection 134. A bushing 144 is press fit into socket 142 with bushing opening 146 aligned with aperture 136 to allow the pivot shaft end portions 140 to extend through bushing 144 and into aperture 136. The inside diameter of bushing 144 closely corresponds to the diameter of pivot shaft 140 for precise radial positioning of the pivot shaft. Likewise, the outside diameter of bushing 144 substantially exceeds the inside diameter thereof to provide substantially increased surface contact between the perimeter of bushing 144 and socket 142, again for precise radial positioning of the pendulum pivot shaft 140. The shall inside diameter of the bushing 144 minimizes frictional contact with the pivot shaft 140 whereas the substantially greater outside diameter facilitates accurate positioning of the bushing.

A pair of allen screws 148 are threaded into apertures 136 into engagement with the dependent shaft end portions 138 but without applying any compressive forces which would cause friction to retard free pivotal movement of shaft 140. The axial positioning screws 148 afford the significant advantage of enabling axial adjustment of pivot shaft 140 to accommodate any warping of either panel 120 for example. If panel 120b should warp so as to move the center projection 134 to the right as seen in FIG. 7, allen screw 148 could simply be threaded slightly further into the aperture 136 to maintain the pivot shaft 140 in the precise axial position illustrated in the drawings. This is readily distinguishable from prior pendulum levels such as that illustrated in Knapp U.S. Pat. No. 1,373,336 wherein the pointed ends of the pendulum shaft would fall to an off center position in the conical sockets of the support panels in the event those panels should flex outwardly even slightly. Accordingly, the screw means 148 of this invention enable adjustment to compensate for any of the predictable distortion of panels 120.

Pendulum 124 includes an upper wedge-shaped needle portion 150 which serves as an indicator arm and a lower semi-circular shaped portion 152 which serves as a counter weight. A needle portion 150 projects perpendicularly from the middle of the straight edge 154 of semi-circular portion 152 and terminates in a tip 156. The sides of pendulum 124 are marked with top and bottom indicator lines arranged along a line intersecting pivot shaft 140. Likewise, the straight edge 154 of semi-circular portion 152 intersects pivot shaft 140. As a result, the inclination indicator 118 affords a four-point readout in that the inclination of the level can be read at tip 156, at line 160 at the base of semi-circular portion 152 or at either opposite end of the pendulum straight edge 154.

The exterior faces of window panels 120 are accordingly imprinted with indicia 162 which is arranged in four quadrants and repeated in each quadrant to simultaneously provide four separate read outs of the inclination of the level frame 112. Since the indicia 162 at the bottom of the panels is inverted relative to the indicia toward the top, the indicator can be easily and conveniently read by the operator in any position whether he be upright, or with his head inverted or inclined to one side.

Semi-circular portion 152 of pendulum 124 includes a cylindrical sleeve 164 for receiving a counter weight rod 166 of steel or the like. The sleeve is arranged along the vertical center line through the pendulum so that the center of gravity of the pendulum is along the line intersecting tip 156 and pivot shaft 140 and, specifically somewhat below pivot shaft 140. Like the prior embodiment, the indicia 162 printed on the exterior faces of panels 120 includes degree gradations 168 (from 0 to 90 degrees) as well as typical roof slope 170 in each of the four quadrants.

Thus, it can be seen that a novel carpenter's level has been provided which accomplishes at least all of its stated objectives.

I claim:

1. A level, comprising:
   an elongated frame having straight and parallel top and bottom edges, front and back sides, and opposite ends,
   said frame having an aperture through said front and back sides,
   front and back generally transparent panels adapted for closing opposite ends of said aperture,
   coacting means on said transparent panels and frame for positively positioning said panels on the frame in a fixed position thereon,
   a pendulum having front and back sides, a weighted end and an opposite end,
   means for rotatably supporting said pendulum on said panels for rotation about an axis extended front to back through said frame,
   said opposite end of the pendulum having a true vertical indicator means aligned with said axis and center of gravity of the pendulum whereby said true vertical indicator means gravitates toward a position directly above said axis in response to movement of the frame to a position with said axis horizontally disposed,
   inclination idicia on said transparent panels for registration with said true vertical indicator means to indicate the angle of the top and bottom edges, and
   said means for rotatably supporting said pendulum comprising a pivot shaft means having front and rear end portions protruding from the front and back sides of said pendulum respectively, said pivot shaft means being fixed to said pendulum for axial movement therewith,
   each of said front and back panels having an aperture therein for receiving a respective end portion of said pivot shaft means, and
   means for adjusting the axial position of said pivot shaft end portions in said aperture,
   each of said generally transparent panels having interior and exterior faces, the interior face of each panel including a bushing supported within said socket and substantially filling the diameter thereof for accurate positioning of the bushing on said panel and said pivot shaft end portion extending through said bushing for engaging said means for adjusting the axial position of said pivot shaft end portions.

2. The level of claim 1 wherein said means for adjusting the axial position of said pivot shaft end portions comprises internal threads in said apertures and screw means threadably received in said aperture.

3. The level of claim 2 wherein said screw means comprises a pair of allen screws.

4. The level of claim 1 wherein the outside diameter of said bushing is substantially greater than the inside diameter thereof.

5. The level of claim 4 wherein the diameter of said pivot shaft end portions closely conform to the inside diameter of said bushings for accurate radial positioning of the pivot shaft end portions.

6. The level of claim 1 wherein said coacting means for positively positioning said panels on the frame comprises
   (a) registered holes in said front panel, back panel and frame, each hole extending completely through one of said front and back panels, through said frame and at least partially through the other of said front and back panels,
   (b) a single fastener means insertable into each of said registered holes, each said fastener adapted to hold both of said panels in alignment with each other and with said frame and each said fastener being of a size and shape to completely fill said hole through said one panel, said frame and at least a portion of said other panel for a positive and accurate positioning of said panels in said frame.

7. The level as described in claim 6 wherein said frame is in the shape of an I-beam and said front and back sides are the web thereof, and said top and bottom edges are the flanges thereof.

8. The level as described in claim 6 further comprising,
   a continuous groove cut around the perimeter of the interior face of each said panel,
   a continuous compressible seal means inserted in said groove, and
   each said seal being compressed against said vertical side of said frame when said panels are attached to said frame, thereby forming a waterproof seal.

9. The level as described in claim 6 wherein said true vertical indicator means includes a pointer arm portion projecting from the free end of said indicator portion of said pendulum, said pointer arm portion extending within close tolerance of said panel and inclination indicia to reduce distortion upon reading of the imprinted indicia.

10. The level of claim 6, wherein the weighted end of said pendulum is a slightly greater than semi-circular disc portion mounted to rotate about the approximately center of the diameter of said disc portion, said pendulum having a center of gravity located slightly below the pendulum's axis of rotation.

11. The level as described in claim 6,
wherein each said hole has an interiorly threaded portion in one of said panels,
wherein each said fastener has an exteriorly threaded end corresponding with the threaded portion of said hole, a shak of a diameter in close tolerance with the diameter of said hole, and an enlarged head portion with a diameter greater than that of the hole; and
wherein said fastener is adapted to draw said front and back panels against said frame in registered relation upon the threading of said fastener into the threaded portion of said hole.

* * * * *